May 1, 1956　　　　J. E. NAUTA　　　　2,743,896
AUTOMATIC WEIGHER FOR MIXTURES
Filed Sept. 3, 1952　　　　　　　　　　　　4 Sheets-Sheet 1

INVENTOR.
JOHANNES EWARDUS NAUTA
BY
　　　　　AGENTS

May 1, 1956 J. E. NAUTA 2,743,896
AUTOMATIC WEIGHER FOR MIXTURES
Filed Sept. 3, 1952 4 Sheets-Sheet 2

INVENTOR.
JOHANNES EWARDUS NAUTA
BY
Hazeltine, Lake & Co.
AGENTS

May 1, 1956  J. E. NAUTA  2,743,896
AUTOMATIC WEIGHER FOR MIXTURES
Filed Sept. 3, 1952  4 Sheets-Sheet 3
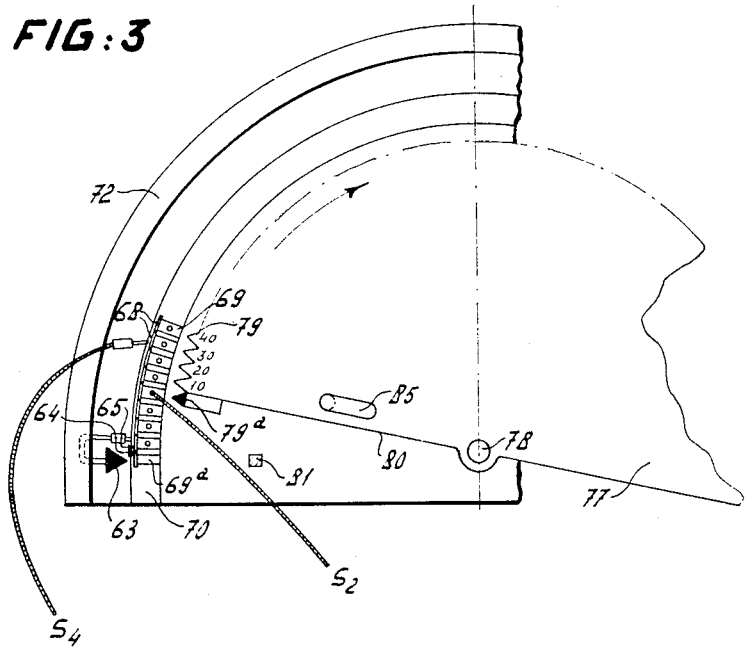
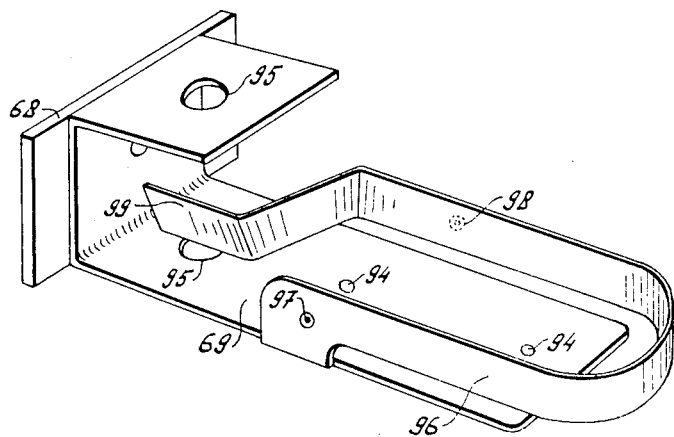
INVENTOR.
JOHANNES EWARDUS NAUTA
BY
AGENTS

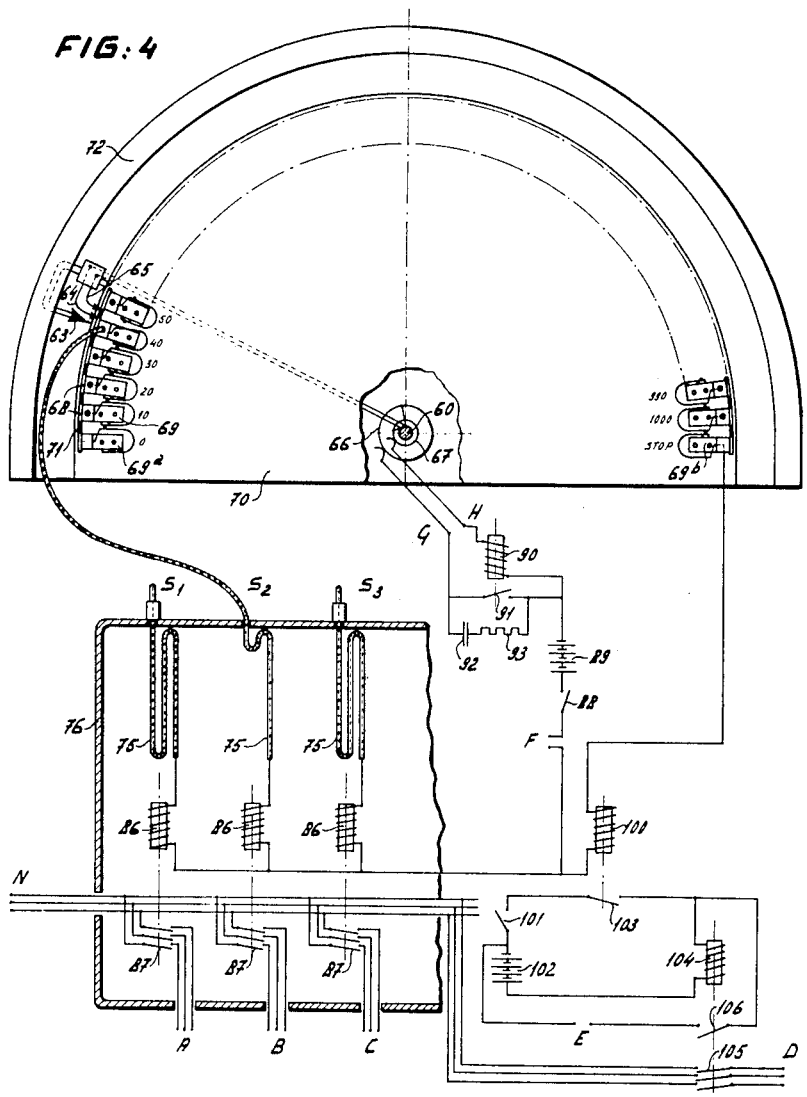

United States Patent Office 2,743,896
Patented May 1, 1956

2,743,896

AUTOMATIC WEIGHER FOR MIXTURES

Johannes Ewardus Nauta, Overveen, Netherlands

Application September 3, 1952, Serial No. 307,640

Claims priority, application Netherlands
September 5, 1951

1 Claim. (Cl. 249—14)

This invention relates to apparatus for feeding quantities of a number of substances into a weighing vessel.

In order to prepare mixtures of substances which are stored in separate storage vessels, each vessel is provided with a separate electrically driven device for transferring the substances from the storage vessels to the weighing vessel. The substances may be successively supplied. The quantity of added substance correlates to the increase of weight of the contents of the associated weighing vessel. Each supplying device, therefore, is kept in an operating state in a certain way (as will be shown) to be controlled by the pointer of the weighing device. This control can be made automatic by causing the pointer to produce an electrical contact with a contact segment which is arranged in an electrical circuit in such a manner that a substance is supplied as long as the pointer is in contact with the contact segment.

In weighing apparatus ordinarily used in plants in which mixtures may be prepared in this manner, the pointer of the indicating device is arranged near the weighing device which itself is arranged over the weighing vessel. In an automatic system, therefore, when the composition of the mixture has to be changed frequently, the adjustable electric device is inconveniently situated.

An object of the invention is accordingly to provide an improved weighing apparatus having an adjustment for the adjustable electric device which is conveniently situated.

Another object of the invention is to provide, in such weighing apparatus, an adjustable electric device which can be adjusted and controlled in a very simple and easy manner.

Still another object of the invention is to provide a weighing apparatus which avoids the danger of preparing wrong mixtures.

Still another object of the invention is to provide apparatus for successively weighing out quantities of a number of solids or liquids in a vessel, in which the quantities already weighed out are stored until the last quantity has been weighed out, comprising a switching member, whose position depends in a linear way on the total weight of the substances in the weighing vessel, the switching member electrically stopping the supply of a substance to the vessel and starting the supply of another substance when it reaches certain adjustable switching position.

Other objects and advantages of the invention will be clear from the description which follows:

In accordance with the invention, an automatic weighing device is constructed in such a manner that the operating stand for adjusting the switching positions is remote from the weighing vessel and that this vessel causes, by means of a system of levers, a mechanical tension in a pressure or tension element leading from the place of the weighing vessel to the operating stand. This tension depends on the weight of the contents of the weighing vessel, but is much smaller than the weight, the pressure or tension element controlling the switching member at the operating stand.

The invention will be further explained by means of the embodiment shown in the accompanying drawings by way of example, wherein:

Fig. 3 is a view of a part of the switching box.

Fig. 4 shows the electrical connection diagram of the apparatus.

Fig. 5 shows a perspective of a mounting element used in the apparatus.

Figure 1:
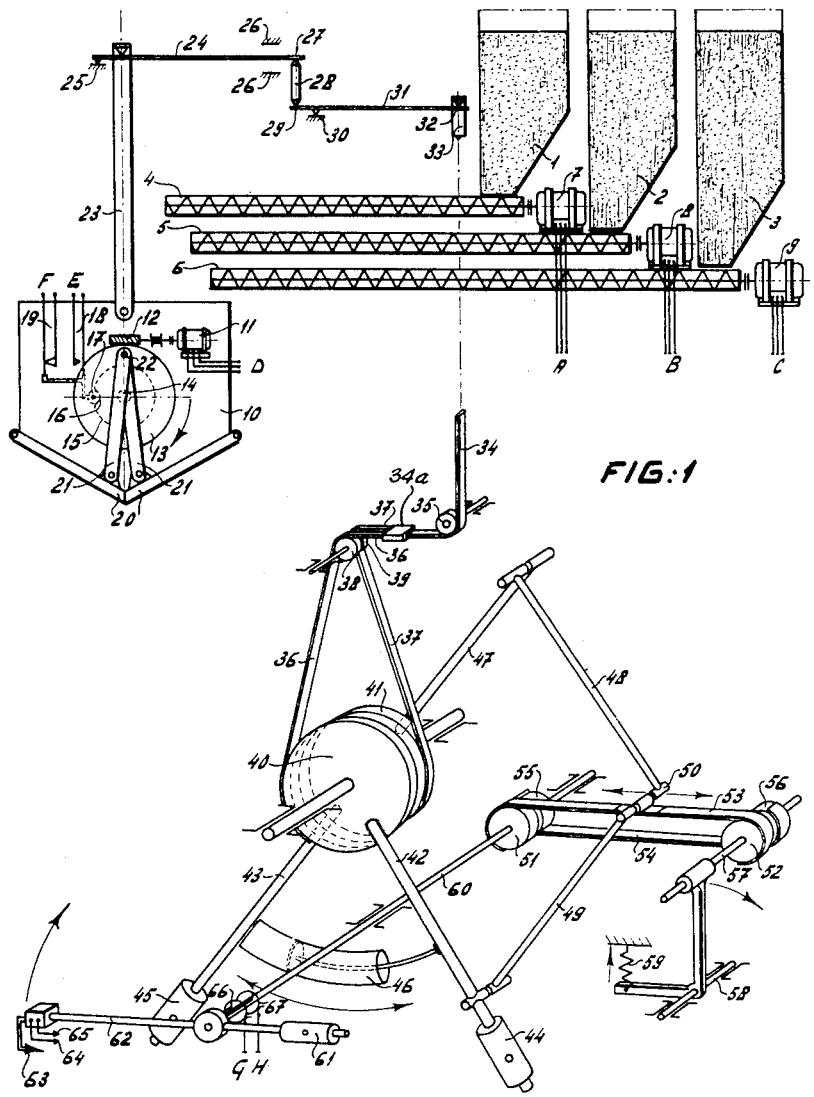
Fig. 1 shows diagrammatically a general view of the weighing apparatus, the storage vessels and the device for supplying substances to the weighing vessel from the storage vessels (for simplicity's sake only three storage vessels have been shown).

In Fig. 1, the contents of the storage vessels 1, 2 and 3 are, for example, e. g. different kinds of flour to be continuously transported to a weighing vessel 10 by means of screw conveyors 4, 5 and 6 driven by electric motors 7, 8 and 9. For enabling the emptying of the weighing vessel 10 an electric motor 11 is mounted on the vessel and drives a worm wheel 13 on a shaft 14 by means of a worm 12. The shaft 14 is rotatively supported in opposed walls of the weighing vessel 10 and carries a disc 15 provided with a notch 16. In the position of the disc 15 shown in the drawing, a roller 17 engages the notch 16. Roller 17 operates one contact spring of each of the pairs of contact springs 18 and 19. In the illustrated position of the disc 15, the contact springs 18 are out of contact and the contact springs 19 are in contact, but in all other positions of the disc 15 the reverse happens. The bottom of the weighing vessel 10 is constituted by two flaps 20 hingedly connected to the side walls of the vessel. The flaps 20 are connected by rods 21 to a crank pin 22 on the worm wheel 13. Upon energizing the motor 11 the flaps 20 will, therefore, at first be opened and subsequently closed, since the crank pin 22 will move downwards at first, but will then move upwards. The weighing vessel is suspended by means of rods (only the rod 23 being visible in the drawing) extending to a lever 24, one extremity 25 of which has a fixed support. Abutments 26 prevent unrestricted movement of the free end 27 of the lever 24. The extreme end 27 rests by means of a pressure rod 28 on one end 29 of a lever 31 which has a fixed support at a point 30. The other end 32 of the lever 31 carries a tension rod 33 which extends from the end 32 and is connected to the end of a tie band 34. The system of the levers is shown only diagrammatically, but includes knife edges and bearings therefor in such a manner as to maintain the desired ratios between the operative lengths of the portions of the lever arms and the linear tension in the tie band 34.

The tie band 34, which normally is under a relatively small tension, is extended from the weighing place to the remote operating stand and, it is possible to lead the tie band, if necessary, over rollers arranged in such a manner as to result in practically no friction. In the present case, the tie band 34 is only shown on the roller 35. The lower end of the tie band 34 is attached to a block 34a, to which block is attached the upper end of each of two tie bands 36 and 37 which are led around rollers 38 and 39. The two tie bands 36 and 37 are attached to the circumferences of discs 40 and 41 which independently rotate about a common axis with very small friction. The discs 40 and 41 carry equal weights 44 and 45 on arms 42 and 43 which are of the same length and at equal angles with the vertical. In the absence of frictional and other disturbing forces, the distance between the weights determines the tension in the tie band 34. A damping device diagrammatically indicated as a dashpot 46 dampens the movement of the arms to the desired extent. A part of the arm 42, the rod 47 constituting the prolongation of the arm 43 and the rods 48 and 49 constitute substantially the sides of a parallelogram, the rods 47 and 48, the rods 48 and 49 and also the rod 49 and the arm 42 being pairwise paired and pivotable one with regard to the other about axes which are always parallel to the axis of rotation of the discs 40 and 41. The distance of the pivot axis 50 of the connection between the rods 48 and 49 to the axis of the discs 40 and 41 is proportional to the distance of the weights 44 and 45. The axis 50 is mounted on a tie band 53 which is connected to discs 51 and 52. A tie band 54 is connected to discs 55 and 56, the discs 52 and 56 being arranged to avoid friction on an axis 57 which can move about an axis 58 having fixed bearings. A spring 59 keeps the tie bands 53 and 54 under tension. The discs 51 and 55 are mounted together on a shaft 60 which minimizes friction in its fixed bearings. On the end of the shaft 60 there is mounted a rod 62 provided with a counterweight 61, a pointer 63 and two brushes 64 and 65 one brush being electrically insulated from the other. The angular displacement of this rod is proportional to the displacement of the axis 50, so that the brushes 64 and 65 and the pointer 63 move in proportion to the increase of the substance in the weighing vessel 10. The brushes 64 and 65 are connected through slip rings 66 and 67 to the terminals G and H.

Figure 2:
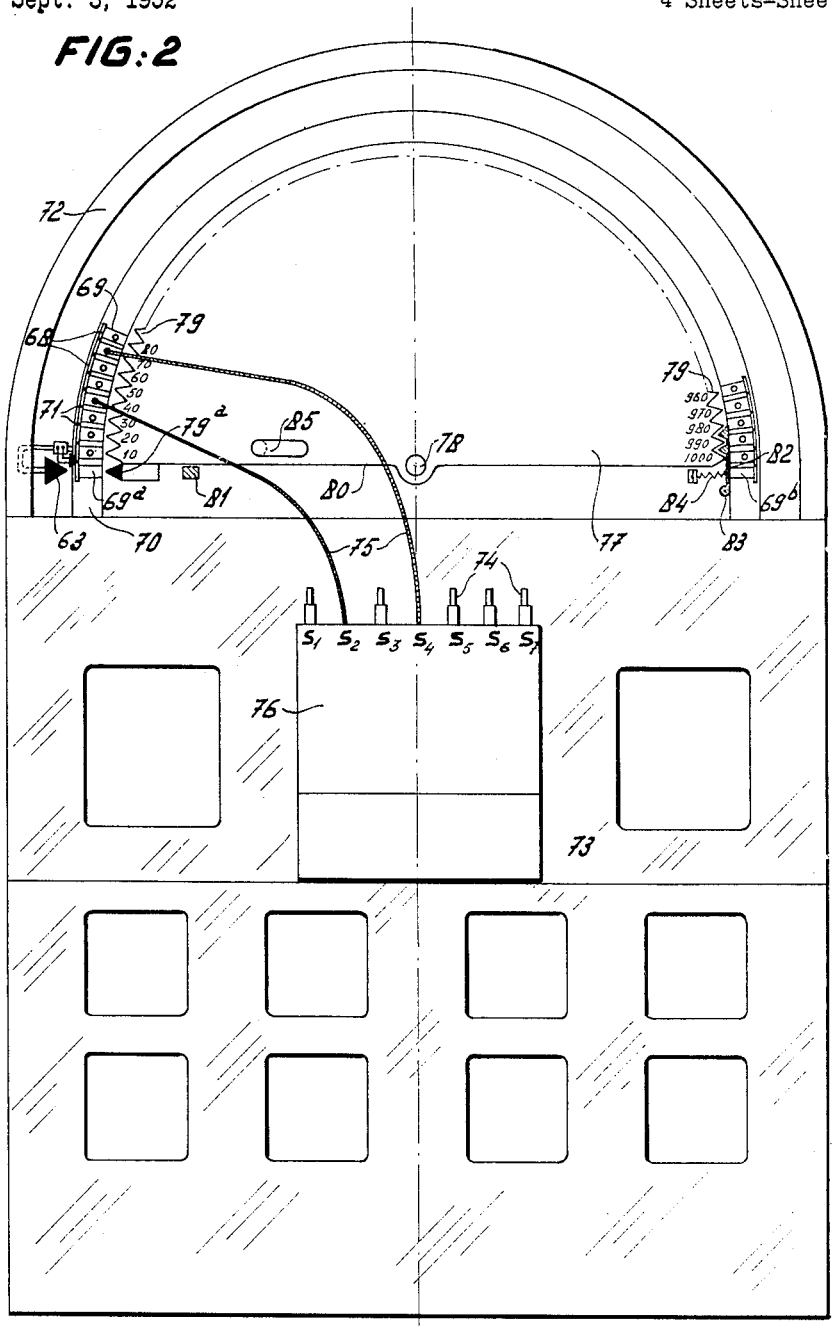
Fig. 2 is a view of the switching box used in the apparatus.

Upon a movement of the rod 62, the brushes 64 and 65 pass with light electrical content over a number of contacts 68 (Figures 2–4). The contacts 68 are mounted on mounting elements 69 mounted on an insulating disc 70 with a semi-circular border. Between adjacent contacts 68 there are spans filled with elements 71 of insulating material so as to allow the brushes 64 and 65 to slide along a smooth circumference in passing from contact to contact. The brush 65 is the main brush and the brush 64 is an auxiliary brush which establishes contact with the contacts 68 as they are left by the main brush. The pointer 63 is visible at the outside of the segments in each position and is protected by a rim 72 which like the disc 70 is attached to the frame 73. To protect the operating mechanism from dust, the box is closed by a dust-proof door, the upper part of which has a window.

Near the middle of the circle along which the mounting elements 69 are arranged a number of single-pole plugs 74 are arranged at regular intervals and are attached to flexible insulated conductors 75. As long as the plugs are not used, the conductors are in a box 76. A conductor can be pulled out and returned to the box by releasing the plug, which, for example, can be obtained by a pulley and a weight or by a spring. Each storage vessel is provided with a plug; for example the plugs $S_1$, $S_2$ and $S_3$ control the storage vessels 1, 2 and 3. In order to obtain special materials in weighed out quantities from special storage vessels, the plugs corresponding to these vessels have to be positioned in openings in selected ones of the mounting elements 69.

According to the drawings, it is assumed that each weighing vessel contains 1000 kg. in total and that each quantity to be weighed out is 10 kg. or a multiple thereof. For this purpose, there are 100 mounting elements arranged in an arc and also an auxiliary first mounting element 69a at the beginning and a final mounting element 69b at the end of the arc. When the weighing vessel is empty, the pointer 63 is just opposite the first mounting element 69a, whereas the main brush 65 is just between establishing contact and establishing no contact with the segment of the next mounting element. Furthermore a substantially half-circular disc 77 is present before the disc 70 and is rotatable about the axis 78 which is situated in the extension of the shaft 60. This disc 77 bears at its circumference an arc of 101 teeth 79. When this disc 77 rests with its border 80 against an abutment 81 arranged on the disc 70, a tooth 79a provided with a special mark (e. g., a special colour), is opposite the first mounting element 69a, the other teeth being opposite the next 100 mounting elements. Therefore, with exception of the final mounting element 69b, each mounting element is opposite a tooth. These teeth are provided in their order of succession with the indication numbers 10, 20, 30 . . . 980, 990, 1000 and the series begins at the tooth next to the specially marked tooth 79a. Between the last teeth there are positioned teeth of a centering element 82, which is pivotally mounted to move about an axis 83 and is pulled into the position shown in the drawing by a spring 84. When the disc 77 is rotated about the axis 78 by means of the handle 85 attached to the disc 77, the centering element 82 will function to locate the disc in a position in which the tooth 79a is just opposite the middle of a mounting element.

Supposing now that it is desired at first to convey 40 kg. of substance from the storage vessel 2 to the weighing vessel 10. The disc 77 is adjusted into such a position that the border 80 rests against the abutment 81 as is shown in Fig. 2, whereupon is determined which mounting element is opposite the tooth with the number 40. The 100 mounting elements 69 are provided with fitting openings for the plugs. The plug $S_2$ corresponding to the storage vessel 2 is plugged in the opening of the determined mounting element. If that is to be followed by 30 kg. of substance from the weighing vessel 10 controlled by the plug 64, the disc 77 is rotated into a position in which the tooth 79a is opposite the mounting element in which the plug $S_2$ was mounted. Thereafter the mounting element opposite the tooth with the number 30 is located and the plug $S_4$ is inserted into that element as is shown in Fig. 3. Proceeding with the other substance to be added in the same manner and supposing that the quantities to be mixed are together just 1000 kg., the plug corresponding to the storage vessel containing the substance that is to be added finally will have to be put into the mounting element just preceding the final mounting element 69b, so that this is a check of the correct carrying out of the necessary operations. To avoid confusion, the first mounting element 69a and the final mounting element 69b are not provided with an opening for the plugs.

As Fig. 4 shows, each of the flexible wires 75 attached to a plug is connected to one coil of a system of relay coils 86, which control the closing of close relay contacts 87, by which closing the terminals N fed by the supply tension are connected to the terminals A, B, etc. These terminals are the same ones as the terminals A, B, etc. of the motors 7, 8, etc. in Fig. 1. The extremities of the coils 86 which are not connected to the plugs, are connected one with the other and led to one of the terminals F of the contacts 19 on the weighing vessel 10. The other one of the terminals F is connected to a hand controlled switch 88 connected to one of the terminals of a direct current source 89. The whole weighing apparatus can be put out of operation by means of this switch 88. The other terminal of the current source 89 is over a relay coil 90 and a slip ring 67 connected to the main brush 65 and is also in connection with the auxiliary brush 64 through a break contact 91 operated by a coil 90 and shunted by the series connection of a condenser 92 and a resistance 93 in order to suppress sparking. This parallel circuit is in series with the slip ring 66. By their special construction as shown in Fig. 5, the mounting elements 69 and also the elements 69a and 69b all establish contact one with the other as long as not a single one of the plugs has been put into these elements. The mounting element 69 carries the segment 68 and has openings 94 for the mounting and openings 95 for introducing one of the plugs. Further it carries an elastic strip 96 provided with contact points 97 and 98. If the mounting elements are attached in the right place on the disc 70, the contact points 97 and 98 of an element rest against contact points 98 and 97 of the two adjacent elements. As soon as the pin of a plug is put through the openings 95 in the mounting element, however, the contact point 98 of a mounting element no longer remains against the adjacent contact point since the inclined extremity 99 of the elastic strip 96 which is attached to the mounting element only near the contact point 97, is pushed aside and takes with it the contact point 98. In the position of the plugs and the mounting elements shown in Fig. 4 the mounting elements indicated by the numbers 0, 10, . . . 40 and therefore also the corresponding segments are all connected to the plug S2, but the segments next to these are not connected with that plug. When the weighing vessel is empty, the auxiliary brush 64 establishes contact with the segments of the mounting element 69a so that when the switch 88 is closed and the disc 15 has the position shown in Fig. 1, the particular relay 86 corresponding to the plug S2 is energized, whereupon the supply potential appears on the terminals B and the motor 8 will convey substance from the storage vessel 2 to the weighing vessel 10. When the auxiliary brush 64 leaves the contact segment of the mounting element 69a, the relay 86 concerned still receives current over the main brush 65 which then establishes contact with the next contact segment. As the coil 90 then breaks the contact 91, the auxiliary brush is no longer able to carry current. When the main brush leaves the first normal mounting element 69, the next thing that happens will be that the relay 86 concerned will no longer receive any current, but now the coil 90 is deenergized and the contact 91 is closed again, so that the main brush will again carry current. The relays 86 are constructed in such a manner that a short interruption of their energizing current does not cause their contacts 87 to be broken. This sequence of actions repeat themselves at the following contact segments, up to the moment that the main brush 65 establishes contact with the first of the segments which are not connected to the plug S2, after which moment the main brush will carry current, but through another relay 86, so that another motor will be energized and another substance will be supplied. The energizing of the motor 8 on the other hand is immediately interrupted by the energizing of the coil 90 and the breaking of the contact 91. This motor is of a type which very rapidly stops upon interruption of the energizing. When the main brush 65 arrives at the next mounting element bearing a plug, switching over to a next substance takes place in a similar manner. When no other plugs are plugged in, the main brush touches a segment which is electrically connected to a mounting element 69b, which itself is connected to an extremity of a relay coil 100, the other extremity of which is connected to that one of the two terminals F which is connected to the joined extremities of the coils of the relays 86. Now the supply of substance to the weighing vessel is terminated and the weighing vessel can be emptied if the switch 101 is operated by hand depending on the situation in following parts of the plant. For then the source of direct current 102 can energize the relay coil 104 through the switch 101 and the contact 103, causing the closure of the contacts 105 and supplying current to the terminals D of the motor 11 on the weighing vessel. By the rotation of the disc 15, the contact 19 will be broken and since the terminals F then are not connected to each other, the coil 100 will be de-energized. However, before the contact 19 is broken, the contact 18 is closed so that the coil 104, which can no longer be energized from the source 102 through the contact 103, is now energized from the same source through a contact 106 being closed when the coil 104 is energized and through the terminals E which are connected when the contact 18 is closed. Thus the motor 11 remains energized until the disc 15 has made a complete revolution, after which the circuit for the coil 104 is interrupted at the contact 18 because the roller 16 returns to the notch 17. Now the motor 11 stops, even though the contact 19 is closed and again mutually connects the terminals F, since the direct current source 89 can no longer energize the relay coil 100 as the flaps 20 have in the meantime opened and therefore the weighing vessel is empty and the brushes 64 and 65 have returned to their initial position. When the switch 88 is closed, the device will immediately start filling the weighing vessel again.

The device described will stop immediately upon the occurrence of a bad contact and therefore it will never convey to the weighing vessel an excess of substance, so that no mixtures are prepared which are valueless or can only difficultly be further treated, will result. To be sure that no wrong mixtures will be composed, either by mistake or intentionally, it is desirable to provide the access to the plugs with a lock and to cause the source of direct current 89 to be switched off as long as the plugs are accessible. If desired, for certain or for all storage vessels more than one plug can be arranged which permits a substance to be supplied in two or more parts between one or more other substances. Plugs corresponding to the same storage vessel have to be electrically connected directly one with the other.

There will now be obvious to those skilled in the art many modifications and variations utilizing the principles set forth and realizing many or all of the objects and advantages of the apparatus described but which do not depart essentially from the spirit of the invention.

What I claim is:

In a multiple materials batching apparatus, the combination of a multiple materials weighing vessel to receive different materials to be batched; a series of storage vessels for different materials; supplying means intermediate the storage vessels bins and the hopper weighing vessel for supplying and cutting off different materials; a weighing device for the weighing vessel including a movable electrical brush responsive to the total weight of materials in the weighing vessel; a series of fixed electrical contacts cooperating consecutively with said movable electrical brush; a series of connecting members, each constituting an electrical connection between a fixed contact and an adjacent fixed contact; plugs to be connected with any one of said fixed contacts and operating said supplying means consecutively so that the different materials of the storage vessel will be supplied into the weighing vessel consecutively; and means controlled by said switching plugs to interrupt the electrical connection between a fixed contact cooperating with the plug and an adjacent fixed contact.

References Cited in the file of this patent

UNITED STATES PATENTS

| 1,835,104 | Watson | Dec. 8, 1931 |
| 1,846,153 | Sherman | Feb. 23, 1932 |
| 2,199,010 | Robb | Apr. 30, 1940 |
| 2,527,147 | Noble | Oct. 24, 1950 |
| 2,549,704 | Noble | Apr. 17, 1951 |
| 2,607,555 | Noble | Aug. 19, 1952 |

FOREIGN PATENTS

| 656,656 | Germany | Feb. 16, 1938 |
| 672,082 | Germany | Feb. 21, 1939 |